US005206897A

United States Patent [19]

Goudreau et al.

[11] Patent Number: 5,206,897

[45] Date of Patent: Apr. 27, 1993

[54] HOME INCARCERATION SYSTEM

[76] Inventors: Noel Goudreau, 2 Turnbridge Turn, Bourbonnais, Ill. 60914; Dale Monty, 671 Bishop Ct., Bradley, Ill. 60915

[21] Appl. No.: 739,423

[22] Filed: Aug. 2, 1991

[51] Int. Cl.[5] ..................... H04M 11/04; H04M 1/26; G08B 23/00

[52] U.S. Cl. ........................................ 379/38; 379/42; 379/49; 340/505; 340/539; 340/573

[58] Field of Search ....................... 379/38, 42, 49, 50, 379/106, 97, 355, 359; 340/505, 539, 573, 576, 592, 825.36, 825.44

[56] References Cited

U.S. PATENT DOCUMENTS 3,564,214 2/1971 Cooper, Jr. ...................... 235/61.11
4,338,601 7/1982 Nance-Kivell ................. 340/870.02
4,747,120 5/1988 Foley .................................. 379/38

FOREIGN PATENT DOCUMENTS 0034230 8/1981 European Pat. Off. .

OTHER PUBLICATIONS

Marconi Electronic Devices, "Electronic Monitoring Programme-The Hawk", Aug. 1988.

*Primary Examiner*—James L. Dwyer
*Assistant Examiner*—Wing F. Chan
*Attorney, Agent, or Firm*—Wood, Phillips, Van Santen, Hoffman & Ertel

[57] ABSTRACT

An incarceree identifying circuit used in an incarceree monitoring system includes an incarceree identifier worn by the incarceree at a remote location with an electrical component having a selected electrical characteristic. A comparator circuit measures the selected electrical characteristic and compares the selected electrical characteristic to a reference electrical characteristic. The comparator circuit triggers a timer if the selected electrical characteristic matches the reference electrical characteristic. The timer provides a signal to a speech circuit to disable a speaker. The tone generator is responsive to the signal and provides a verification signal via a telephone link to a central station. A verification circuit at the central location receives the verification signal and determines the presence or absence of the incarceree at the remote location.

10 Claims, 3 Drawing Sheets

HOME INCARCERATION SYSTEM

FIELD OF THE INVENTION

The present invention relates generally to means for identifying an incarceree in a home incarceration system.

BACKGROUND OF THE INVENTION

With overcrowded jails and work-release centers and the high cost of keeping an individual incarcerated, systems for electronic supervision of criminals have gained increased attention. Benefits of such systems include relieving overcrowding, avoiding the incarceration of non-violent criminals or persons guilty of less serious crimes with career criminals, and allowing probation or parole officers to keep track of a substantially larger number of incarcerees than in the past. However, such a system must also be cost effective to operate.

Prior art personnel monitoring systems, however, have complex circuits for identifying an incarceree. One such system disclosed in U.S. Pat. No. 4,747,120 to Foley, discloses a system utilizing an automatic dialer which randomly calls various incarcerees assigned to a parole officer. A bracelet, which includes coded information and is worn by the incarceree, is placed in a decoder for identification by a sensor. When the bracelet is inserted into the sensor, the decoder couples itself to the telephone line and uncouples the telephone from the telephone line. The sensor then reads the coded information and the decoder performs a handshake procedure if the coded information is the correct information. Any suitable coding scheme may be used, optical, magnetic, capacitive, etc. In the embodiment of the sensor described therein, the coded information is either a sliver of metallic material or a blank. When the sliver is lined up with a foil spiral of an oscillator, the oscillator ceases to oscillate. When the blank is lined up with the foil, the oscillator continues oscillating. The oscillating/nonoscillating can be used to determine if the coded information is correct. Foley has a drawback in that it requires a decoder having complex circuitry.

SUMMARY OF THE INVENTION

An object, therefore, of the invention is to provide an incarceree identifying circuit used in an incarceree monitoring system including an incarceree identifier worn by the incarceree at a remote location with an electrical component having a selected electrical characteristic. A comparator circuit measures the selected electrical characteristic and compares the selected electrical characteristic to a reference electrical characteristic. The comparator circuit triggers a timer if the selected electrical characteristic matches the reference electrical characteristic. The timer provides a signal to a speech circuit to disable a speaker. The tone generator is responsive to the signal and provides a verification signal via a telephone link to a central station. A verification circuit at the central location receives the verification signal and determines the presence or absence of the incarceree at the remote location.

Other objects, features and advantages of the invention will be apparent from the following detailed description taken in connection with the accompanying drawings.

DESCRIPTION OF THE DRAWINGS

In order that the present invention may be clearly understood and readily practiced, a preferred embodiment will now be described, by way of example only, with reference to the accompanying drawings wherein.

DESCRIPTION OF A PREFERRED EMBODIMENT

Figure 1:
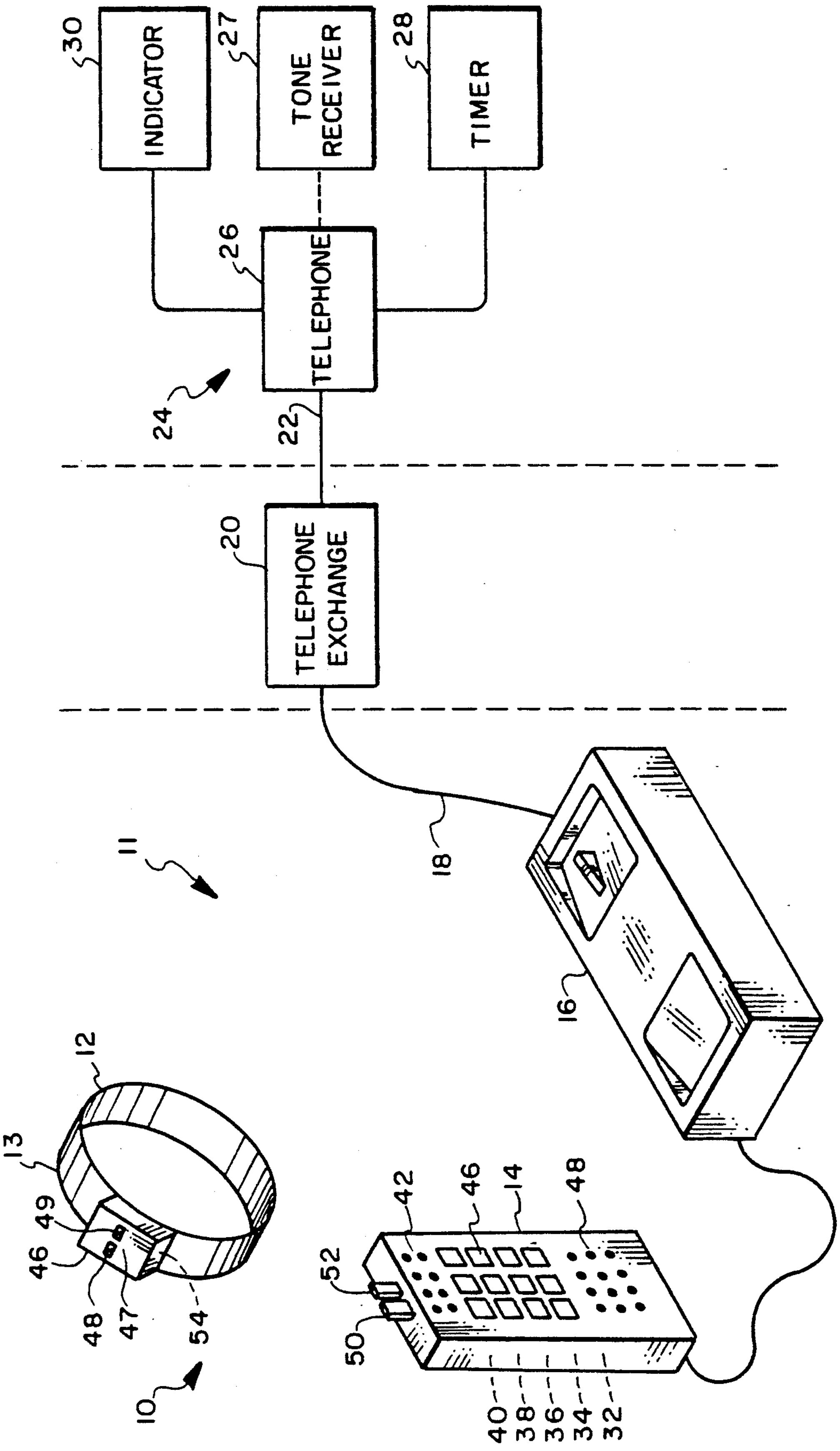
FIG. 1 is a block diagram of a home incarceration system constructed according to the teachings of the present invention.

In FIG. 1, a block diagram of a home incarceration monitoring system 10 of the present invention is shown. The equipment required by the incarceree at a remote location 11 includes an identification band 12 having a strap 13, a telephone handset 14, and a telephone base 16. The identification band 12 is attached to the incarceree's arm or leg. Both the telephone handset 14 and telephone base 16 are standard telephone circuits with simple modifications described below.

The telephone base 16 is connected by a telephone line 18 through a telephone exchange 20 and telephone line 22 to a central location 24. The central location 24 has a telephone 26 including a dual-tone, multi-frequency tone receiver 27, a timer 28, and an indicator 30.

The handset 14 at the remote location 11 houses a comparing circuit 32, a standard tone generator 34, a speech circuit 36, and two timers 38,40, described in detail below and also shown in FIGS. 2 and 3. The handset also includes a speaker 42, a microphone 44, and a keypad 46.

The identification band 12 is worn by the incarceree whose presence is to be monitored. The identification band 12 includes a module 46 having a socket 47 with terminals 48,49. The handset 14 includes two pins 50,52 which are connected to comparing circuit 52. When the operator or parole officer requests a verification from the incarceree, the incarceree places the socket of identification band 12 over pins 50,52 on the handset 14. Identification band 12 includes a resistance 54 connected across the terminals 48,49 of the socket 47. The socket 47 is placed across pins 50,52 to connect the resistor 54 across the terminals 48,49 in socket 47 with comparing circuit 32. Identification band 12 is designed such that removing or tampering with the band 12 alters the resistance of resistor 54. The resistor 54 in the band 12 includes a wire (not shown) extending through the strap 13. When the wire is broken during removal or tampering, the resistance 54 changes and the incarceree will be unable to verify his presence using the system 10.

If the resistor 54 matches the matching resistor 62, comparing circuit 32 generates a signal which is output to tone generator 34. The tone generator generates a tone for a specific duration. The tone is sent via telephone lines 18,20,22 to the central location 24 where the tone receiver 27 verifies the tone and the timer 28 verifies the duration of the tone. Indicator 30 displays verification or the lack thereof. Since the identification band 12 is attached to the incarceree and cannot be removed without altering resistance 54, the incarceree's presence during verification is assured.

Figure 2:
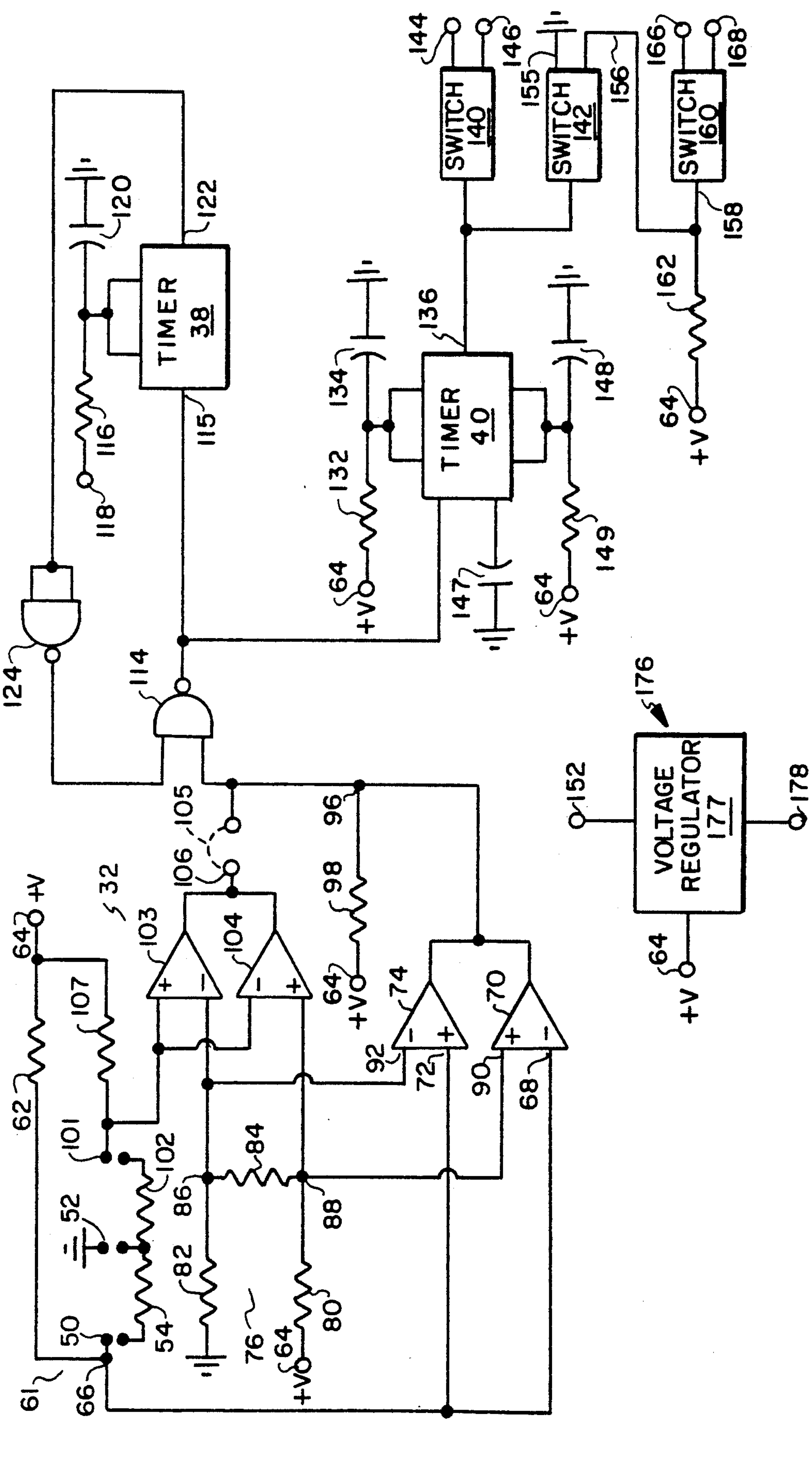
FIG. 2 is an electrical schematic of the comparing circuit and timers.
Figure 3:
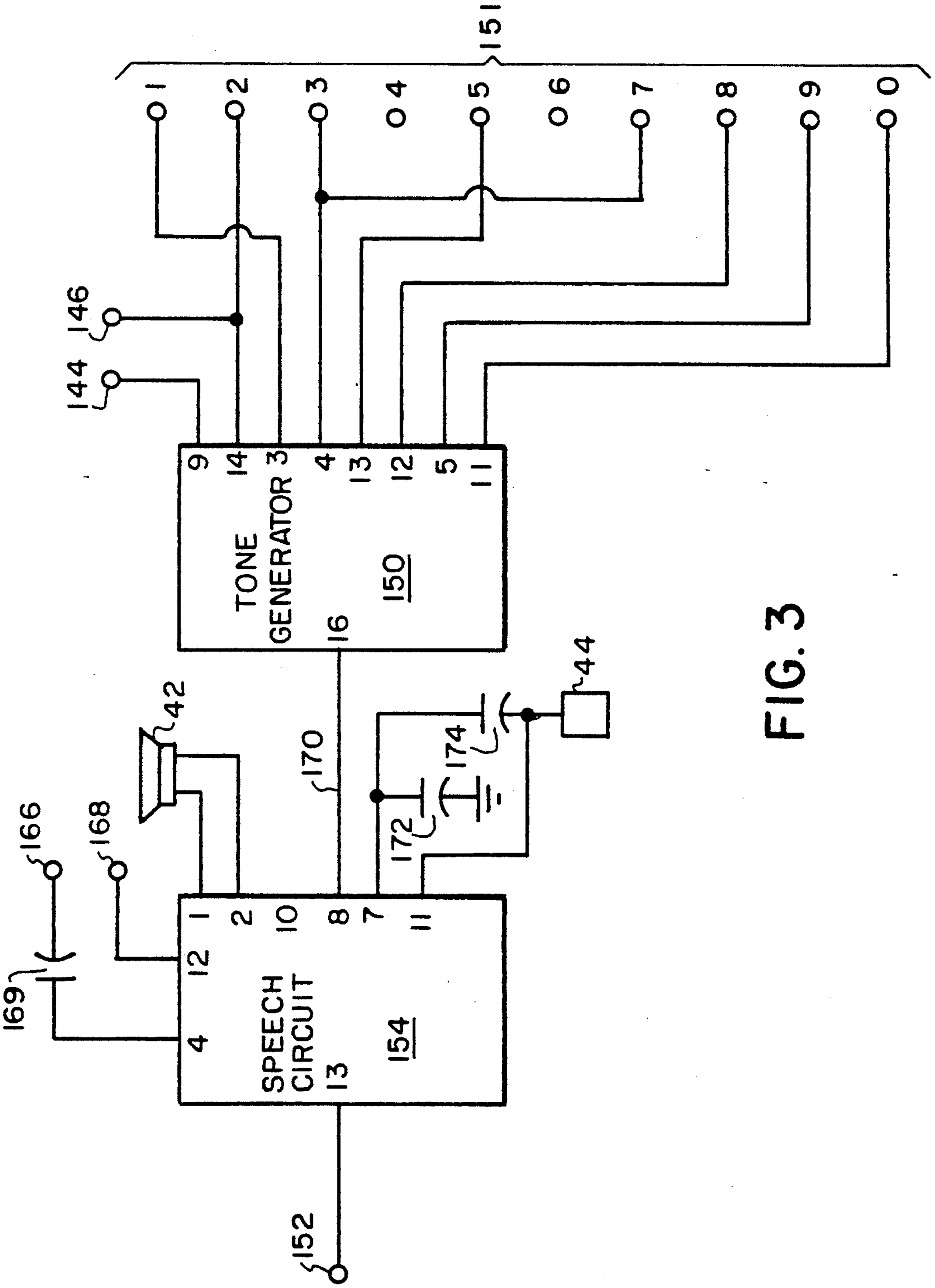
FIG. 3 is an electrical schematic showing the connection between the comparing circuit and timers of FIG. 2 with a standard speech circuit and tone generator.

FIG. 2 is an electrical schematic of the comparing circuit 32 and timers 38,40. When the incarceree connects the terminals 48,49 of the socket 47 on the identification band 12 with pins 50,52 on the handset 14, the resistor 54 is connected across pin 50 and pin 52. A voltage divider circuit 61 is created between the resistor 54, a matching resistor 62, and a voltage source 64. The output 66 of the voltage divider circuit 61 biases a negative node 68 of a voltage comparator 70 and the positive node 72 of a voltage comparator 74.

An additional voltage divider circuit 76 is formed by the voltage source 64, resistors: 80,82 and a window resistor 84. As a result of the voltage dividing circuit 76, a lower threshold voltage appears at rode 86 and a higher threshold voltage appears at node 88. The higher threshold voltage is connected to a positive node 90 of voltage comparator 70 and the lower threshold voltage at node 86 is connected to a negative node 92 of the voltage comparator 74. The difference in the lower and upper threshold voltages is set by the window resistor 84.

If the voltage appearing at node 66 as a result of the voltage divider 61, which includes resistor 54 in the identification band 12, is less than the higher threshold voltage at input 90 and greater than the lower threshold voltage at node 92, the outputs of both comparators 70,74 will be high. Both of the voltage comparators 70,74 are connected as open collectors and receive their output voltage at a node 96 from a supply resistor 98 which is biased by the source 64. The comparator circuit 30 operates such that the voltage at node 96 is high only when both comparators 70,74 have outputs which are high.

An additional matching resistor 100 could be utilized for identification bands 12 having two matching resistors.

In such a case, an additional terminal (not shown) on the module 46 adjacent the terminals 48,49 of the socket 47 would be added along with a corresponding pin 101 (not shown in FIG. 1) on the handset 14. An additional resistor 102 located in the module 46 is connected across the additional terminal and either terminal 48 or terminal 49. When the incarceree places the socket 48 across pins 50,52 and 101, resistors 54 and 102 are connected to the comparing circuit 32. In this case, two additional comparators 103,104 operate similar to comparators 70,74. A jumper 105 connects an output 106 of both comparators 103,104 to node 96. A matching resistor 107 and resistor 102 create a voltage divider which biases an input of comparators 103 and 104. The other input of comparators 103 and 104 is biased by voltage divider circuit 76 similar to that described with respect to comparators 70 and 74.

When matching resistor 107 and resistor 102 are within the window set by window resistor 84, both outputs of comparators 103 and 104 are high. If the outputs of comparators 70 and 74 are also high, the output of NAND gate 114 goes low and the circuit operates as described above. If either resistor 54 or 102 does not match, the incarceree will be unable to verify his presence at the remote location. As can be appreciated, the additional resistor 107 makes it more difficult for the incarceree to tamper with the identification band and still be able to verify his presence at the remote location 11.

Node 96 is then connected to the input of a two-input NAND gate 114 The output of NAND gate 114 is connected to an input 115 of timer 38. A resistor 116, a voltage source 118, and a capacitor 120 set an RC time constant of timer 38 such that timer 38 operates as a five second timer. An output 122 of timer 38 is connected to both inputs of a dual input NAND gate 124. The output of NAND gate 124 is connected to the other input of NAND gate 114. When both inputs to NAND gate 114 are high, the output of NAND gate 114 goes low and triggers timers 38,40. The output 122 of timer 38 goes high for five seconds, is inverted by NAND gate 124, and causes one of the inputs to NAND gate 114 to go low. As a result, the output of NAND gate 114 goes high and prevents retriggering of timer 38 for five seconds.

When NAND gate 114 goes low, it also triggers a timer 40. Timer 40 includes a voltage source 64, a resistor 132 and a capacitor 134 which set an RC time constant for timer 40 to set the duration of timer 40 to 250 ms +/−10 ms. An output 136 of timer 40 is connected to two bilateral switches 140,142. Bilateral switch 140 shorts terminal 144 and terminal 146. Terminals 144 and 146 are connected to pin 9 and 14, respectively, on tone generator 150. Two capacitors 147,148 and a resistor 149 bias timer 40 to obtain the short switching time. When switch 140 shorts terminal 144 and terminal 146, the "A" tone is generated by tone generator 150 and sent to the phone line 152 via speech chip 154, as best seen in FIG. 3. Tone generator 150 is a commercial dual-tone, multifrequency tone generator, identified as TCM 5087. Speech chip 154 is a commercial speech chip, identified as TP5700A.

One terminal 155 of bilateral switch 142 is connected to ground while the other terminal 156 of bilateral switch 142 is connected to an input 158 of bilateral switch 160 Input 158 is also connected to a resistor 162 and the voltage source 64. When the output 136 of timer 40 goes high, bilateral switch 142 causes the input 158 of bilateral switch 160 to go low. As a result, terminals 166,168 act as an open circuit. Terminal 166 is fed through a 0.047 microfarad capacitor 169, as described in the TP5700A data sheet. Since terminal 166 and terminal 168 are an open circuit, pins 4 and 12 of speech chip 154 are also an open circuit. When pin 4 and pin 12 are an open circuit, the speaker 42 is disabled. The "A" tone sent on line 152 by tone generator 150 can barely be heard in the telephone speaker 42. The speaker 42 is disabled so that the incarceree will be unable to hear the verification tone which would normally be output through speaker 42. Thus, it will be more difficult for the incarceree to circumvent the system.

Tone generator 150 includes inputs 151 used to select the tone to be generated. Note, tone "A" cannot be generated by the key pad 46. Tone generator 150 generates dialing tones 0–9, # and * in response to a respective button on key pad 46 of handset 14 being depressed. The tone generator 150 also has four standard extra tones A, B, C, and D. Shorting of two pins on the tone generator 150, in the case of a TCM 5087, pins 9 and 14, causes an "A" tone to be generated at pin 16 of tone generator 150 and sent to pin 8 of the speech generator on a line 170.

Speech chip 154 receives the DC and analog voltage from the telephone line and drives the telephone receiver speaker 42. Speech chip 154 transmits the tone received from tone generator 150 and the voice from telephone microphone 44 to the line 152. Microphone 44 is connected to a 0.001 microfarad capacitor 172 and a 0.1 microfarad capacitor 174.

The other inputs and outputs of speech generator 154 and tone generator 150 have standard resistor and capacitor values and connections, as described in their respective data sheets.

Power supply 176 is a micro-power voltage regulator. Voltage regulator 177 receives its voltage from line 152 of speech chip 154 and converts the signal to a regulated 3.1 volt output 178 to power the comparators, NAND gates, timers and bilateral switches.

It will be understood that the invention may be embodied in other specific forms without departing from the spirit or central characteristics thereof. The present example's embodiments, therefore, are to be considered in all respects as illustrative and not restrictive, and the invention is not to be limited to the details given herein.

We claim:

1. In a monitoring system for reporting the presence of an incarceree at a remote location, the system having
a central office with a central telephone,
a remote telephone at said remote location,
means for establishing a telephone link between the central telephone and the remote telephone,
means associated with said remote telephone for generating a verification signal, and
means associated with said central telephone for recognizing said verification signal,
means for identifying the incarceree, comprising:
an incarceree identifier, attached to the incarceree with an electrical component having a selected electrical characteristic;
a comparator circuit associated with said remote telephone for generating a comparison signal;
a reference electrical component connected with said comparator circuit and having an electrical characteristic which matches the selected electrical characteristic of the incarceree identifier electrical component;
means for connecting said incarceree identifier with said comparator circuit to compare the electrical characteristics of the identifier and reference electrical components; and
means responsive to said comparison signal from said comparator circuit for triggering said verification signal generating means when the characteristic of said incarceree identifier electrical component matches the electrical characteristic of the reference component,
wherein the remote telephone includes a tone generator actuated by said means responsive to said comparison signal from said comparator circuit and providing a verification signal transmitted to said central office over said telephone link, and
wherein said means responsive to said comparison signal from said comparator circuit includes a timer, and having a switch connected to an output of the timer, the switch actuating the tone generator to provide the verification signal.

2. The incarceree identifying means of claim 1 in which the remote telephone includes a speaker controlled by a speech circuit, said means responsive to said comparator circuit providing a signal to said speech circuit to disables aid speaker during transmission of said verification signal.

3. The incarceree identifying means of claim 1 wherein the incarceree identifier is a bracelet.

4. The incarceree identifying means of claim 1 wherein the telephone at the remote location includes a handset, the handset housing the comparator circuit, a speech circuit and a tone generator, the handset including an exposed plug and the incarceree identifier having a socket receiving the plug to establish an electrical connection between the incarceree identifier electrical component and the comparator circuit.

5. In a monitoring system for reporting the presence of an incarceree at a remote location, the system having
a central office with a central telephone,
a remote telephone at said remote location,
means for establishing a telephone link between the central telephone and the remote telephone,
means associated with said remote telephone for generating a verification signal, and
means associated with said central telephone for recognizing said verification signal,
means for identifying the incarceree, comprising:
an incarceree identifier, attached to the incarceree with an electrical component having a selected electrical characteristic;
a comparator circuit associated with said remote telephone for generating a comparison signal;
a reference electrical component connected with said comparator circuit and having an electrical characteristic which matches the selected electrical characteristic of the incarceree identifier electrical component;
means for connecting said incarceree identifier with said comparator circuit to compare the electrical characteristics of the identifier and reference electrical components; and
means responsive to said comparison signal from said comparator circuit for triggering said verification signal generating means when the characteristic of said incarceree identifier electrical component matches the electrical characteristic of the reference component,
wherein said means responsive to said comparison signal from said comparator circuit includes a timer which prevents retriggering of said comparator circuit for a period after said characteristic of said incarceree identifier electrical component matches the electrical characteristics of said reference component.

6. In a monitoring system for reporting the presence of an incarceree at a remote location, the system having
a central office with a central telephone,
a remote telephone at said remote location,
means for establishing a telephone link between the central telephone and the remote telephone,
means associated with said remote telephone for generating a verification signal, and
means for identifying the incarceree, comprising:
an incarceree identifier, attached to the incarceree with an electrical component having a selected electrical characteristic;
a comparator circuit associated with said remote telephone for generating a comparison signal;
a reference electrical component connected with said comparator circuit and having an electrical characteristic which matches the selected electrical characteristic of the incarceree identifier electrical component;
means for connecting said incarceree identifier with said comparator circuit to compare the electrical characteristics of the identifier and reference electrical components; and
means responsive to said comparison signal form said comparator circuit for triggering said verification signal generating means when the characteristic of said incarceree identifier electrical component matches the electrical characteristic of the reference component, wherein said incarceree identifier electrical component and said reference electrical component are resistors.

7. The incarceree identifying means of claim 6 wherein the comparator circuit includes a first and second voltage comparator each having a positive and negative input, and wherein the incarceree identifier resistor is electrically connected to the reference resistor to provide a matching voltage which is connected to the negative input of the first comparator and to the positive input of the second comparator, and an output of the first comparator and an output of the second comparator are connected to said means responsive to said comparator circuit to trigger said verification signal generating means.

8. The incarceree identifying means of claim 7 wherein the comparator circuit includes a resistive voltage divider circuit biasing the positive input of the first comparator with an upper voltage and the negative input of the second comparator with a lower voltage, and wherein the matching voltage is greater than the lower voltage and less than the upper voltage when the incarceree identifier resistor substantially equals the reference resistor.

9. The incarceree identifying means of claim 8 in which said voltage divider circuit includes a window resistor defining the difference between the upper and lower voltage.

10. The incarceree identifying means of claim 6 further including an additional reference resistor and an additional identifier resistor in said incarceree identifier, said connecting means establishing electrical connection between said additional identifier resistor, said additional reference resistor and said comparing circuit, said means responsive to said comparator circuit triggering said verification signal generating means only when said additional reference resistor matches said additional identifier resistor and said reference resistor matches said identifier resistor.

* * * * *